United States Patent [19]

Chao

[11] 3,837,234
[45] Sept. 24, 1974

[54] BICYCLE WITH STEPLESS TRANSMISSION

[75] Inventor: Yau-Shieng Chao, Taipei, Taiwan

[73] Assignees: Stanley T. T. Wu; Yau-Shieng Chao, both of Taipei, Taiwan

[22] Filed: May 21, 1973

[21] Appl. No.: 361,999

[52] U.S. Cl. .................. 74/217 B, 74/230.17 A
[51] Int. Cl. ................. F16h 55/22, F16h 11/04
[58] Field of Search ............... 74/217 B, 230.17 A

[56] References Cited
FOREIGN PATENTS OR APPLICATIONS

| | | | |
|---|---|---|---|
| 224,180 | 12/1909 | Germany | 74/230.17 A |
| 72,542 | 9/1915 | Switzerland | 74/230.17 A |
| 1,043,123 | 11/1958 | Germany | 74/217 B |

Primary Examiner—Leonard H. Gerin

[57] ABSTRACT

Bicycle with stepless transmission wherein the transmission mechanism forms a part of the bicycle frame, and a remote control mechanism with a shifting lever is installed right under the steering handle, the remote control mechanism comprising a rotatable plate with said shifting lever and a pair of discs, the remote control mechanism being connected to the transmission mechanism through a pair of cables and a pair of spring biased discs which store mechanical energy and release it later for changing the depth of grooves of a pair of V sheaves that in turn change the speed of the rear wheel of the bicycle.

7 Claims, 14 Drawing Figures

BICYCLE WITH STEPLESS TRANSMISSION

FIELD OF DISCLOSURE

The present invention relates generally to a bicycle with a stepless speed transmission, and more particularly to a bicycle with a stepless speed transmission having a remote controlled shifter which comprises pairs of spring biased discs coupled by a pair of cables to a set of V belt sheaves. The stepless transmission is accomplished by setting the shifter at any desired position, with the gradual release of energy accumulated in the spring biased discs. The device is able to achieve the stepless transmission effect when the bicycle is in motion.

BACKGROUND OF INVENTION

Gear transmission devices are most commonly seen in the conventional bicycle with speed transmission. The number of shift steps thereof is determined by the number of gear couples provided. Therefore, if more shift steps is desired, the number of gears has to be increased accordingly. This in turn increases the volume of the mechanism and also the cost. There have already appeared on the market bicycles with speed transmission of many shifts up to ten steps, and there is a tendency to increase this to even more steps. Of course, it is impossible for a gear type transmission to achieve a stepless effect. Among stepless transmission means, friction wheels, conical wheels and V groove sheaves are most commonly used. However, V sheaves seem to be able to give the best performance. The operation of speed shifting using the abovesaid means has to be operated by a bar coupled directly to the mechanism, and the hand of the operator should not leave the shifting bar until the change is completed. For this reason, such a kind of transmission is incapable of being installed on bicycles. In other words, even if it is installed, the location of installation usually is inaccessible to the rider and a remote control means has to be provided. No such means has yet been provided. Even if it is so provided, the stepless shifting must depend on the relative change of the depth of grooves of sheaves in question. Also, such changing can only be effected during the moving of both the sheaves and the belt thereon. This requires sufficient outside force and time to deal with. The rider then has to steer the handle with one hand and hold the shifting bar with the other hand. Such a shifting means would be quite impractical.

SUMMARY OF INVENTION

For the elimination of abovesaid shortcomings, the inventor of this application provides a stepless speed transmission means suitable for bicycle use. More particularly, the present invention provides a stepless speed transmission with V type sheaves as its basic construction, in combination with shifting discs which can be simply operated in either direction and set at any desired position with a shifting lever, and through a pair of control cables coupled with two spring biased control discs of similar construction to the shifting discs. With a single operation of shifting the control lever, the spring of the control discs stores up the energy just like an accumulator and releases it gradually to make the speed transmission automatically, after the shifting operation, the speed ratio being maintained at the setting level.

Therefore, the main object of the present invention is to provide a stepless transmission that can be installed at a location right under the frame. By applying a single operation to a shifting lever which is movable in either of two directions along a circumference of a pair of discs and set at a desirable position, the action is transmitted through a pair of control cables to another pair of discs which are spring biased. The spring of said discs is wound up to store mechanical energy and the said energy is gradually released with the peddling of the foot cranks to shift the speed transmission through a guiding mechanism.

Another object of the present invention is to provide a V type sheave transmission for a bicycle, having a spring control mechanism, the spring of which can be wound up in either of two directions by a pair of cables which is connected to a pair of shifting discs and operated by a shifting lever. The said spring is capable of storing mechanical energy and releasing it gradually to move a movable sheave member of the V type sheave, thereby changing the relative groove depth of the sheave pair to enable automatic speed change after the shifting lever is set.

Still another object of the present invention is to provide a bicycle with stepless transmission wherein a pair of cranks is disposed at the ends of a driving sheave shaft. A driving sprocket is disposed at one end of a driven sheave shaft. The driving sheave shaft or the crank shaft is disposed at such a location corresponding to the crank shaft of a conventional bicycle, and the driving sheave shaft is ahead of the driven sheave shaft.

A further object of the present invention is to provide a stepless transmission wherein a device used to shift movable sheave members axially against fixed sheave members to change the depth of the sheave grooves is comprised of a spring biased control mechanism and a cam means.

A still further object of the present invention is to provide a remote control means for the stepless transmission having a pair of discs encasing a coil spring, a fan shaped operation base plate provided with a shifting lever and a pair of wedges, a short conical retainer with a hollow shaft, and a pair of cables with ends connected respectively to the sides of abovesaid disc pair and supported around the grooves disposed on the circumference of the discs. At shifting of the lever, the fan shaped base plate rotates to force one of the discs to rotate, the wedge member therein automatically anchoring the disc at any desired position as soon as the operator's hand leaves the shifting lever to enable the stepless transmission.

Still a further object of the present invention is to provide a bicycle with stepless transmission wherein the case enclosing the transmission mechanism constitutes a part of the frame of the bicycle and is provided with a removable side cover and bottom cover.

Other objects and features will become apparent from the following detailed description to be taken in conjunction with the annexed drawings.

BRIEF DESCRIPTION OF DRAWINGS

FIGS. 12 to 14 show the positions of shifter and spring controlled mechanism during the processes of transmission shifting, wherein

DETAILED DESCRIPTION OF THE PREFERRED EMBODIMENT

Figure 1:
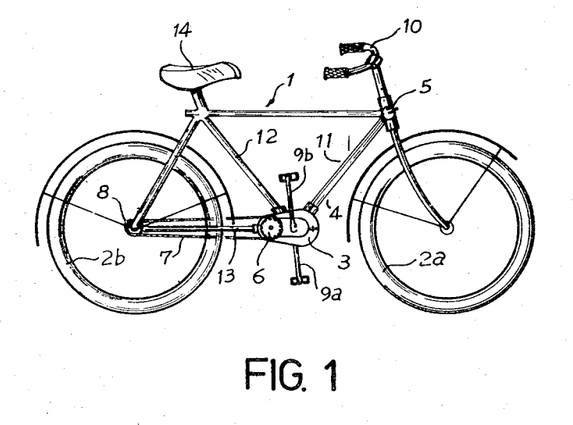
FIG. 1 is a front view of a preferred embodiment of a bicycle with stepless transmission of the present invention.
Figure 2:
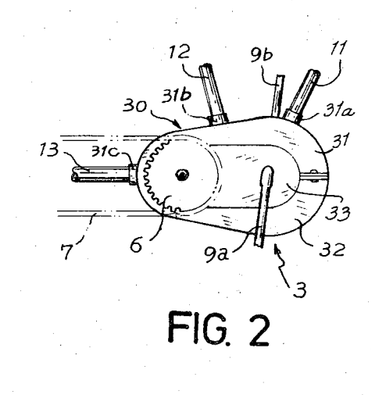
FIG. 2 is a front view of the transmission section.

Now referring to FIGS. 1 and 2, there is shown a bicycle with stepless transmission of the present invention and the installation of the mechanism. The bicycle has a main frame 1, front wheel 2a, rear wheel 2b, and with the stepless transmission 3 installed at a location under the downwardly extending tubular frame portion 11, seat tubular frame portion 12, and chain stays 13. Shifting operation cable 4 is connected between the transmission 3 and shifter 5. Chain wheel 6 and the rear hub sprocket are connected by chain 7. 9a–9b designate the cranks. The numeral 10 designates the steering handle and numeral 14 the seat or saddle.

The abovesaid transmission 3 has a case 30 to retain inside it the transmission mechanism. Case 30 has a main cover 31 with openings at the bottom and at one side and a removable side cover 33 and bottom cover 32 respectively. Sockets 31a and 31b are welded on top and sockets 31c–31c are welded at the rear of the main cover 31. The tubular frame portion 11 and seat tubular frame portion 12 are inserted respectively into sockets 31a and 31b. Two chain stays 13—13 (only one is shown in FIG. 2) are inserted into sockets 31c—31c.

Figure 3:
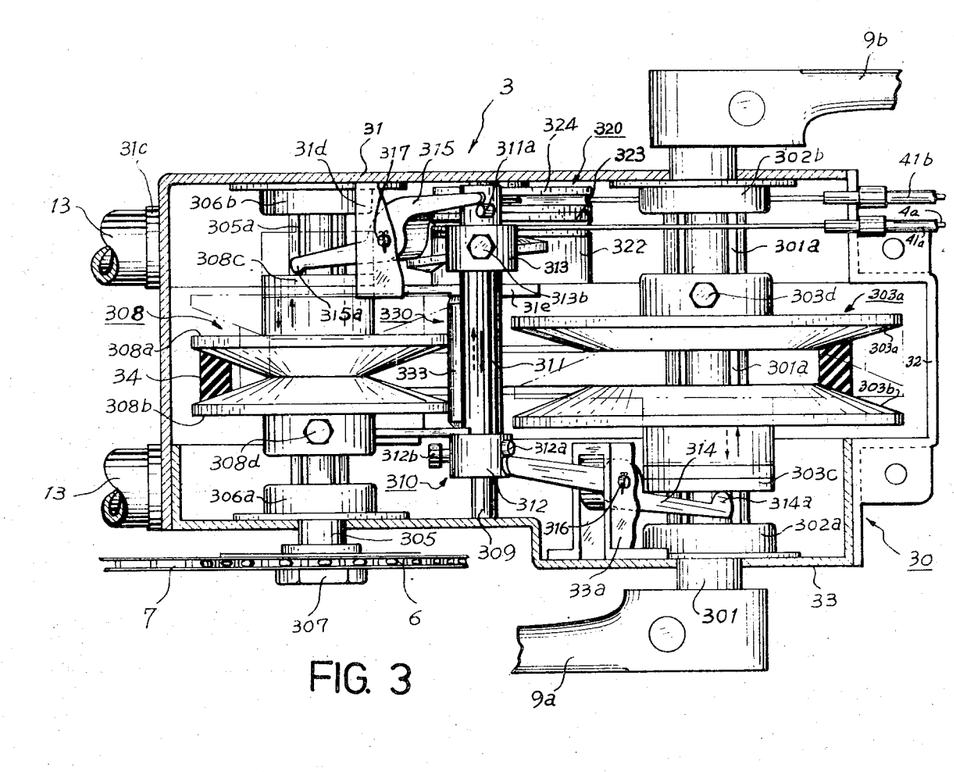
FIG. 3 is a detailed plane view inside the transmission section with the outer case cut away.

FIG. 3 is a plane view showing the inside mechanism, the case 30 being cut away. Main driving shaft 301 is supported at its two ends by bearings 302a, 302b which are disposed at the side wall of main cover 31 and side cover 33 respectively. Both ends of the shaft 301 extend outside of the case 30. The middle section of the shaft 301, that is, the portion between bearings 302a and 302b, is cut to form splines 301a. On the splined shaft 301 are disposed a pair of cone shaped sheave halves 303a and 303b which form the V belt sheave 303. Sheave half 303a is locked to the splined shaft 301, while the other half 303b is slidably mounted on the shaft 301. By moving the movable half sheave 303b toward or away from the fixed half 303a the width of the V groove is changed, or the depth of the groove so far as a designated V belt is concerned is changed. The cranks 9a–9b are disposed 180° apart and fixed at the two ends of shaft 301.

A driven shaft, which is also driving chain wheel shaft 305 is disposed at a rear position and parallel to the main driving shaft 301. Driven shaft 305 is supported by bearings 306a and 306b at its ends. One end of shaft 305 extends out of the side cover 33. Driving chain wheel 6 is mounted at that end by means of a nut 307. The middle section of the driven shaft 305 inside the case 30 has a spline portion 305a similar to driving shaft 301. V belt sheave 308 having a smaller diameter than sheave 303, is composed of sheave halves 308a and 308b which are mounted on spline shaft 305a. A movable sheave half 308a is located at a position corresponding to fixed sheave half 303a while sheave half 308b is a fixed sheave half, located at a position corresponding to movable half 303b of the sheave 303. Fixed half 308b is fixed on shaft 305 by a screw 308d.

The abovesaid halves 303b and 308a of sheaves 303 and 308 are constantly pressed by a switching or shifting mechanism 310 against fixed halves 303a and 308b respectively to clamp them tightly against V belt 34. With the aid of a spring controlled mechanism 320, the movable halves are moved oppositely along the corresponding spline shafts an equal distance. Therefore, the center lines of both belt sheaves are kept always in line. Any deviation caused by the V belt hanging on both sheaves due to the inclination of the belt 34 would be corrected by a belt tension device 330. Thus, belt 34 is capable of transmitting under a constant tension and accomplishing the basic function of stepless transmission.

Figure 7:
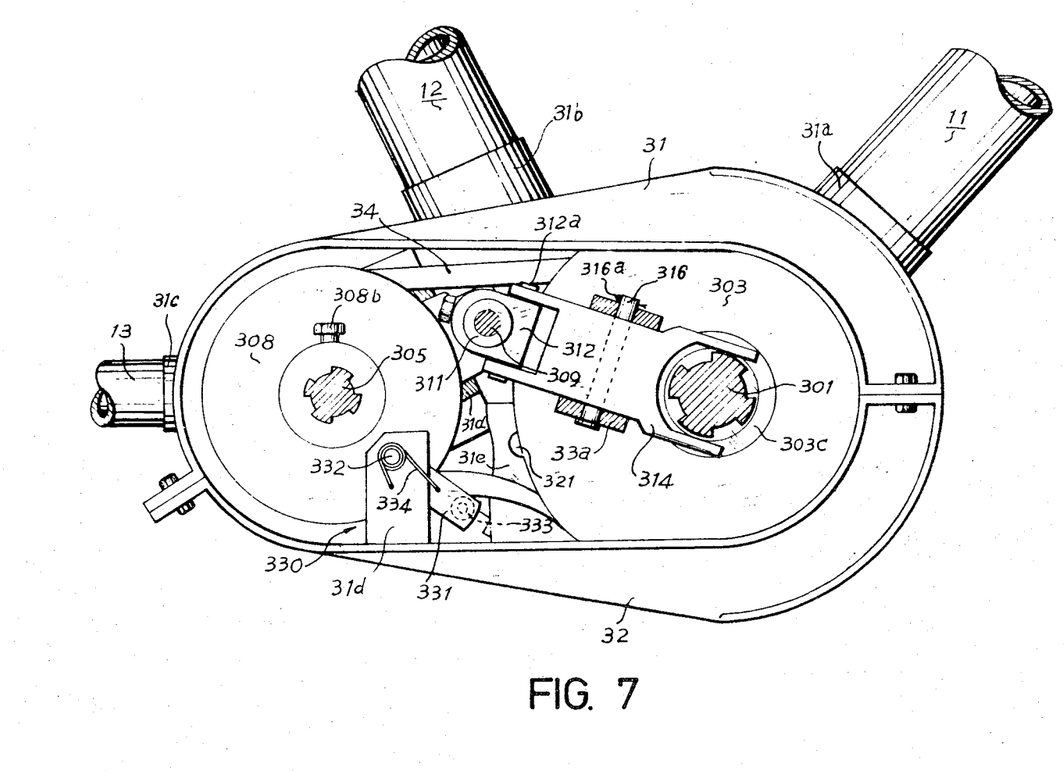
FIG. 7 is a front view of the transmission device with its side cover removed, showing the relationship of belt tension device and the belt sheaves.

Referring to FIG. 7 belt tension device 330 is disposed at the lower side of the sheave 308. The tension device is composed of a roller 333 which is mounted on a U-shaped holding bracket 331 pivotably supported on bearing plate pair 31d—31d by a pair of short shafts 332—332 projecting outwardly from the bracket 331. The bearing plate pair is provided at the side wall of the case 30. Supported on short shafts 332—332 are springs 334—334 which give the roller holding bracket 331 an anti-clockwise turning pressure to cause the roller 333 to bear against the V belt.

A guide shaft 309 is provided parallel to driving shaft 301 and driven shaft 305 which is disposed a little higher than the both shafts. Both ends of shaft 309 are fixed at the inside walls of case 30. On the guide shaft 309 there is a spring controlled mechanism 320 which will be described later with reference to FIG. 5 and shifting or switching mechanism 310 which is to move the movable sheave halves 303b and 308a. The switching mechanism 310 is comprised of a sleeve 311 slidable on guide shaft 309. A switching member 312 is fixed on one end of sleeve 311 by a screw 312b. A cam follower member 313 is fixed on the other end of the sleeve 311 by a screw 313b, and two switching levers 314 and 315 having a fork like construction at both ends.

Figure 4:
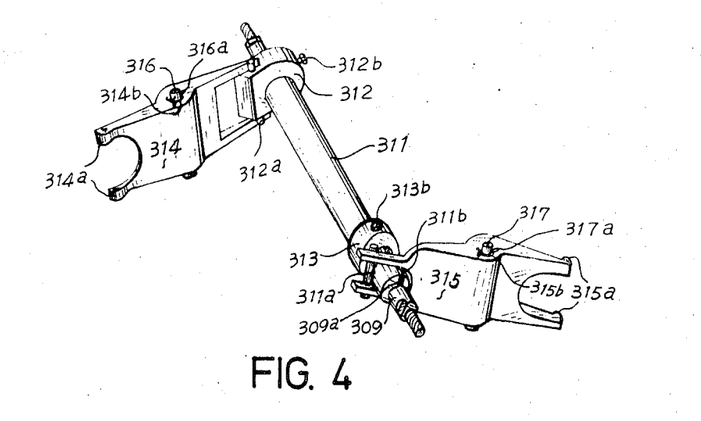
FIG. 4 is a perspective view of the shifting device.
Figure 5:
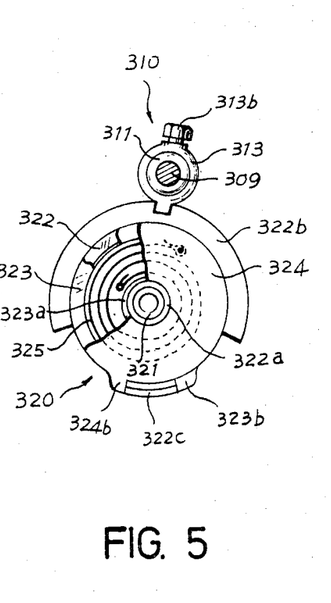
FIG. 5 is a partial cut away front view of the spring controlled mechanism.
Figure 6:
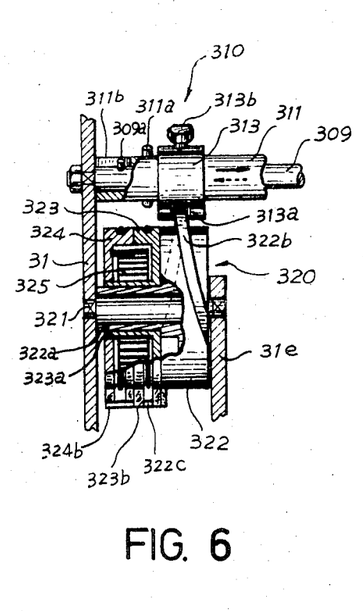
FIG. 6 is a partial cut away left side view of the spring controlled mechanism.

It is apparent from FIG. 4 to 6 that at one end of sleeve 311, welded vertically thereon, is a switching pin 311a. A guide groove 311b is disposed axially from the same end. Also, on the end of guide shaft 309 a guide pin 309a is loosely inserted in the groove 311b. With such an arrangement, the sleeve 311 is capable only of sliding axially but without rotating.

The fork at one end of the switching lever 314 is engaged with the adjustable switching member 312, with one side in contact with the switching pin 312a projecting out of the member 312. The fork on the other end of switching lever 314 extends to engage with the driving shaft 301, its curved end 314a being in contact with the outside surface of a thrust bearing 303c which is mounted on the hub of the movable sheave half 303b. A shaft 316 is passed through a supporting hole 314b in the middle of switching lever 314. The said shaft 316 is thus rotatably supported on the bracket 33a fixed on the case 30. The end of shaft 316 is locked by cotter pin 316a.

The fork at one end of switching lever 315 is engaged with sleeve 311, with one side in contact with switching pin 311a. The fork at the other end of switching lever 315 is engaged with driven shaft 305, the curved end 315a being in contact with the outside surface of a thrust bearing 308c which is mounted on the hub of the movable sheave half 308a. A shaft 317 is passed through a supporting hole 315b in the middle of switching lever 315. The said shaft 317 is rotatably supported on the bracket 31d. The end of shaft 317 is locked by cotter pin 317a.

Now referring to FIG. 5 and 6, the spring controlled mechanism 320 is rotatably mounted at a location below guide shaft 309. The shaft 321 of the mechanism is supported by a side plate 31e and the side wall 31 of the case 30. The said mechanism comprises a pair of disc like wheels 323 and 324 with grooves on their circumferences. A coil spring is contained inside the space formed by the two disc like wheels 323, 324 and has its two ends anchored respectively to the individual discs 323, 324. A cylindrical cam 322 is provided with a spiral rib, the outside of which has a square cross section. Cam 322 has at one surface a hub 322a rotatably supported on the front end of the shaft 321. Disc wheel 323 is rotatably mounted by its hub 323a on the hub 322a of the cam 322. Another disc wheel 324 is rotatably mounted on the hub 323a of the disc wheel 323. Thus, each hub 322a, 323a serves as the shaft of the wheel mounted on it. The spiral rib 322b (see FIG. 6) is capable of sliding freely inside the groove 313a of cam follower member 313 of the switching mechanism 310. Axially extending under the circumference of the cam 322 is a projection plate 322c, which becomes a part of the circumference of cam 322 and is clamped between projections 323b and 324b respective of disc wheels 323 and 324.

Disc wheels 323 and 324 are assembled face to face. Inside the space between them, a strong coil spring 325 is installed. Each of the two ends of spring 325 is anchored at the inside wall of disc wheel 323 and 324 respectively. This tends to make the wheels 323 and 324 rotate in opposite directions and clamp the projection plate 322c strongly between projections 323b and 324b. In such a relationship, if cam 322 is being hampered from rotating, causing either of the disc wheels 323, 324 to be against the force of the spring 325, then the spring is wound due to rotating of either disc wheel in any of the two directions to store up the mechanical energy. Cables 4a and 4b are disposed around the grooves in the circumference of disc wheels 323, 324, respectively, one end of each of the said cables 4a, 4b being fixed in its respective groove, and the cables being wound in the opposite direction at a linear length equivalent to ½ to 1 turn of the wheel circumference.

Figures 8, 9:
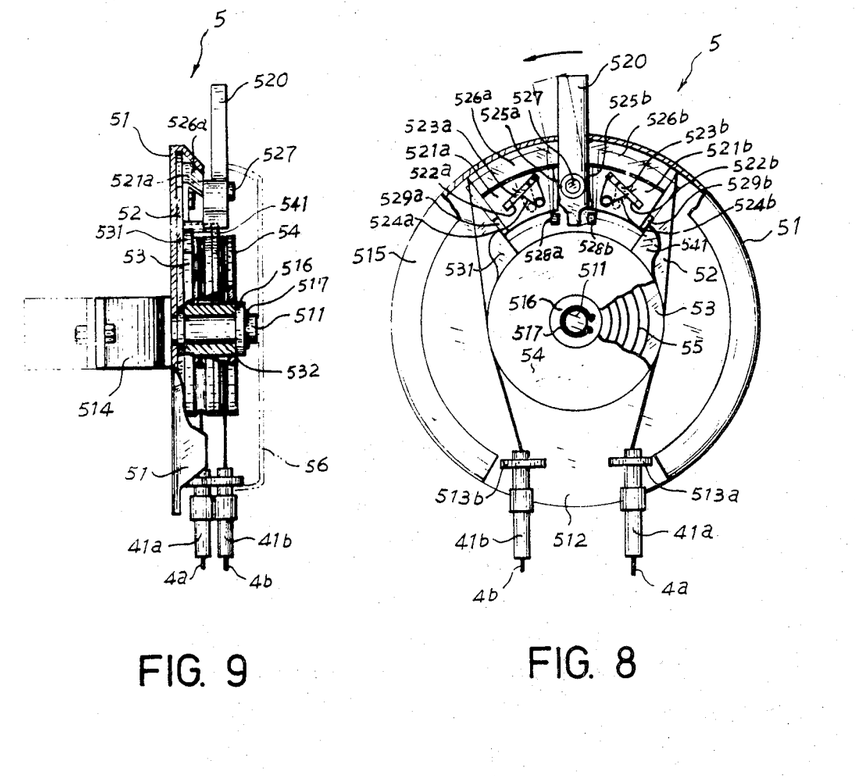
FIG. 8 is a partial cut away front view of the shifting disc.
FIG. 9 is a partial cut away side view of the shifting disc.
Figure 10:
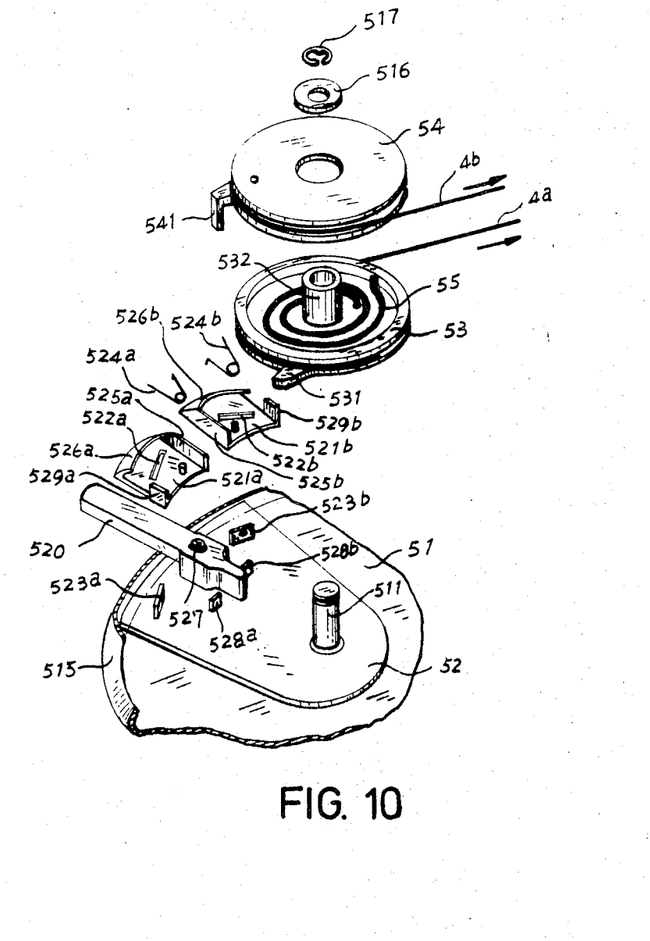
FIG. 10 is a perspective view showing the relation between the shifting disc and the wedges.

Referring to FIGS. 8, 9 and 10, the shifting operation device is comprised of a short conical drum 51, a fan shaped operating plate 52 having a shifting handle or lever 520, a pair of wedge plates 521a and 521b, a pair of spring biased discs 53–54, a coil spring 55 and a cover 56.

The said conical drum 51 has a shaft 511 in the center and at its lower side and opening 512. At the sides of the opening are disposed supporting plates 513a–513b which are for mounting of cable sockets. At the bottom of drum wheel 51 there is a fix plate 514, by which the drum body could be fixed on the upper end of the tubular frame portion 11. The operating plate 52 is rotatably mounted on shaft 511. Upon the plate 52 there are movable wedge plates 521a–521b, each of which has an inclined slot 522a, 522b respectively slidably engaged on the guide plates 523a, 523b on the operating plate 52. Springs 524a, 524b have one end fixed on wedge plates 521a, 521b and other end on guide plates 523a, 523b. One side of each wedge plate is bent up to form vertical surfaces 525a, 525b to contact along side with handle 520. The wedge plates further have curved inclined contacting surfaces 526a, 526b which are freely pressed toward the inside conical surface 515 of the conical drum 51. With such an arrangement, the slidable wedge plates 521a, 521b being pressed by springs 524a, 524b will constantly force against the conical inside surface 515 of the conical drum 51, and hold tightly against the two sides of the handle 520. The handle 520 is pivotally mounted on a pin 527 and projects out of the drum 51. Two stop plates 528a, 528b are disposed near the lower part of the handle 520 to limit the operating angle of the handle 520. The construction of the pair of spring biased discs 53, 54 of the operating plate 52 are somewhat similar to the disc wheels 323, 324 of the spring controlled mechanism 320, i.e. disc 53 is mounted on shaft 511 on plate 52 by its hub 532. Disc 54 is mounted on the hub 532 through its center hole. On top of the hub 532, a washer 516 and a snap ring 517 are used to retain the disc in position.

The discs 53, 54 each have a projection 531, 541 disposed at opposite positions. In grooves provided around the circumferences of discs 53, 54 are cables 4a, 4b with one end of each of the cables being fixed on the disc, and the other ends being respectively wound on the disc wheels 323, 324 of the spring controlled mechanism 320. Due to the dragging force of cables 4a, 4b, the projections 531, 541 of the discs 53, 54 clamp against the sides 529a, 529b of the wedge plates 521a, 521b. In the space formed between discs 53, 54, there is a coiled spring 55, each end of which is fixed inside disc 53, 54 respectively. The direction of action of the spring 55 is just in opposition with the actions of cables 4a and 4b. The strength of the spring 55 is far less than that of the spring 325 of the spring controlled mechanism 320. The purpose of this spring 55 is to tighten the cables 4a, 4b. Cables 4a, 4b are led out through tube sockets 41a, 41b. One end of the sockets 41a, 41b is fixed respectively on supporting plates 531a–531b on the drum 51.

Figure 11:
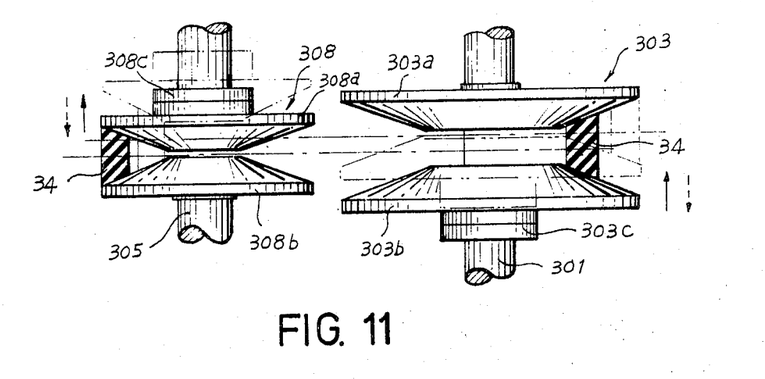
FIG. 11 is a brief illustration of changing of sheave groove depth VS. changing of speed.
Figure 12:
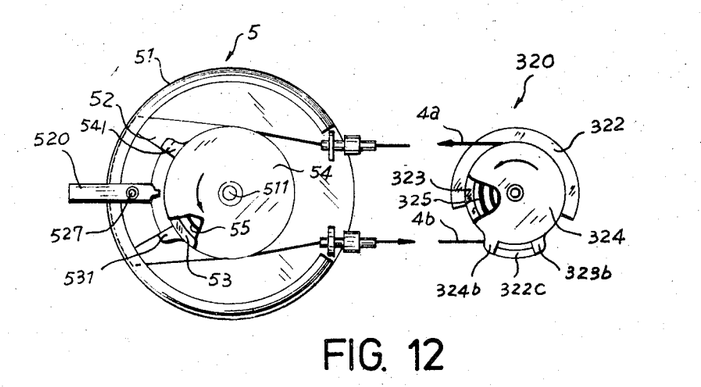
FIG. 12 shows the relationship between the shifter and spring controlled mechanism at medium speed.
Figure 13:
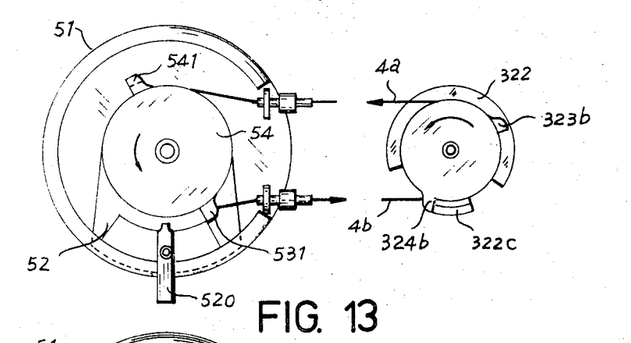
FIG. 13 shows the relationship after the operating handle is shifted from low speed to high speed position, and the belt pulley not yet rotated to transmission.

The operation of the transmission device of the present invention is now described as follows:

In FIGS. 3 and 11, the solid line denotes the bicycle being at its lowest speed. The V groove of the driving sheave 303 is then opened at a maximum width. On the contrary, the driven sheave 308 is closed to its narrowest width. The position of the V belt in the respective sheaves is such that at the driving sheave 303 side, the diameter is the smallest, while the diameter at the driven sheave 308 side, the largest. The ratio of driving/driven diameter is smallest at that time, so the driven sheave 308 has its lowest speed. This speed in turn is transmitted through driving chain wheel 6, chain 7 and driven chain sprocket 8 to the rear wheel 2b of the bicycle. If shifting to a higher speed is required, the handle 520 of the operating mechanism 5 is shifted toward the arrow direction as shown in FIGS. 8 and 12. The handle 520 is moved around the pin 527 as its center, against the force exerted by springs 524a, 524b to thrust open wedge plates 521a, 521b. Wedge plates 521a, 521b are thus moved along the guide plates 523a, 523b in the slots 522a, 522b. The inclined contacting surfaces 526a, 526b thus leave the inclined wall 515 of shifter drum 51, and are in a position as shown by the dotted line in FIG. 8. At the same time, operating plate 52 which is separate from the drum 51 rotates with handle 520. With the side plate 529a of the wedge plate 521a pressing against the projection 531 of disc 53, the disc 53 is moved against the force of cable 4a, and winds up cable 4a. Since one end of the cable 4a is connected to disc 323 of the spring controlled mechanism 320, at this time if the cranks are not in action, the movable sheave half 303b of the sheave 303 would not be able to move along the solid arrow direction of FIG. 3. The switching mechanism 310 would keep still and the cam 322 of the spring controlled mechanism would not rotate. Disc 324, with its projection 324b being hampered by the projection plate 322c would also be unmovable. Only the disc 323, under dragging of the cable 4a would rotate an amount equivalent to that of the operating plate 52 until the position shown in FIG. 13 is reached. Thereby, the spring 325 would be wound up to store inside the spring a mechanical energy corresponding to the amount of the rotation effected.

When operator's hand leaves the handle 520, due to the reaction of the springs 524a, 524b, wedges 521a 521b are restored to their original positions and inclined surfaces 526a, 526b contact again with the inclined surface 515 of the conical drum 51. Due to the strong dragging force of cable 4a, and the wedging action existing between guide plate 523a and inclined surface 515 of the operating drum 51, with these double wedging effects of wedge plate 521a, the operating plate 52 would press hard against the bottom of shifter drum 51 and be fixed steadily. At this time, the relative position between shifter 5 and the spring controlled mechanism 320 is as shown in FIG. 13. Disc 323 is thereby fixed with the aid of cable 4a.

Operation in a reverse direction would give the likewise effect, i.e., no matter to which of the two directions the handle is shifted, the handle could be steplessly fixed at any desired position.

Further on, when the cranks are pedaled, the driving sheave 303 and belt 34 are moved together. The side pressure on movable sheave half 303b decreases and the spring controlled mechanism comes into action releasing stored energy gradually, and changing speed through switching mechanism 310. The disc 324 of the spring controlled mechanism has then a tendency to rotate in a direction as shown by the arrow in FIG. 13 due to the energy releasing action of the spring 325. The rib 322b of cam 322 actuates the switching mechanism shown in FIG. 6 through contacting groove 313a making the sleeve 311 move along the direction shown by the solid arrow. The remainder of the switching mechanism in turn moves correspondingly. As a result, the end 314a of switching lever 314 presses the movable sheave half 303b of the driving sheave 303 toward the solid line direction and makes the belt groove of sheave 303 narrower. Simultaneously, the end 315a of the switching lever 315 moves with the movable half 308a of the driven sheave 308 in the same distance toward the solid arrow direction, to make wider the groove of the driven sheave 303.

Figure 14:
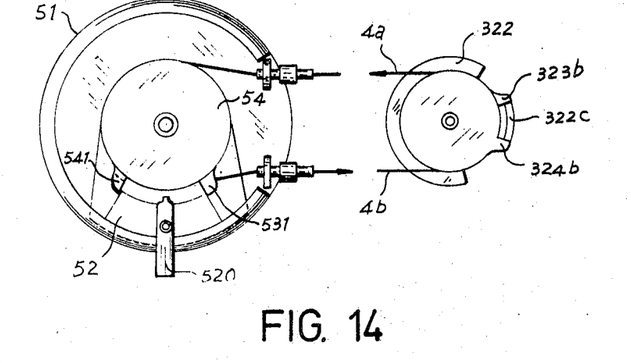
FIG. 14 shows the relationship at high speed.

Accompanying the abovesaid changes, the transmission diameter of the driving sheave 303 becomes larger and that of the driven sheave becomes smaller, so that the ratio of transmission increases. During the changing of speed, the disc 324 of spring controlled mechanism 320 and the cam 322, due to the contact of projection 324b and projection plate 322c, rotates approaching projection 323b. In the meantime, disc 324 winds up cable 4b to make the disc 54 of shifter 5 rotate toward the same direction. As soon as the projection plate 322c contacts with projection 323b, the projection 541 of disc 54 presses against the side plate 529b of the wedge plate 521b. Discs 54 and 324 stop rotating at the same time. Energy originally stored is now released and the transmission desired is thereby accomplished. By this time, the relative position between shifter 5 and spring controlled mechanism 320 is as shown in FIG. 14. The width of the groove of the driving sheave 303 now becomes its narrowest and that of the driven sheave its widest. Belt 34 is at a position having the largest transmission diameter of the driving sheave 303 and the smallest diameter of the driven sheave 308, so that the highest transmission ratio is achieved.

Again, if it is desired to change from a high transmission ratio toward a low transmission ratio, the handle 520 should be shifted toward the reverse direction and the same process continues. Because it is possible to set up at any position of the handle, it is very convenient to accomplish the speed change within the range designed with just a simple shifting operation.

Since the spring controlled mechanism 320 is actuated by a pair of cables 4a, 4b toward either of the two possible directions, unless the handle is shifted, the mechanism 320 would not move. Furthermore, the relationship between cam 322 and the driven member 313 is such as to prevent reversion, i.e. the driven member or follower 313 would never be an actuator to cam 322. Therefore if not in operation, the transmission would be maintained with constant ratio.

In the abovesaid embodiment, it is workable if the auxiliary spring 325 is placed in mechanism 320 while main spring is placed in shifter 5. Otherwise, spring 55 could be changed to a strong one and placed in shifter 5 and spring 325 changed to a weaker one and placed in mechanism 320, and there is reversed the direction of coilage of the respective springs and the winding of cables 4a, 4b, to obtain the same good effect.

Owing to the features abovementioned, it is possible to obtain the stepless transmission of a bicycle easily and with just a single operation.

The above embodiment serves only for illustration and not for restriction. Any modifications that will be evident to those skilled in the art should be considered with the scope of the present invention as defined by the attached claims.

I claim:

1. A stepless transmission for a bicycle comprising a V type sheave transmission installed at the lower portion of a frame of the bicycle, a remote control shift means mounted on a bicycle handle post, a pair of spring biased discs provided on said transmission, a spring for biasing said discs, and a pair of cables connecting said spring biased discs and said shift means, said shift means having a shifting lever whereby by applying a single operation to said shifting lever, the action is transmitted to said spring biased discs through said cables, causing said spring to wind up and store mechanical energy, said energy being released with the rotation of cranks of said bicycle to shift the speed transmission through a guide means.

2. A stepless transmission according to claim 1, wherein the V type sheave transmission has a pair of changeable groove depth V type sheaves, a shift device for moving movable sheave members of said V type sheaves, a spring controlled disc means for storing mechanical energy and releasing it to move said shift device and a belt tension means.

3. A stepless transmission according to claim 1, wherein the cranks of the bicycle are disposed at the ends of a driving sheave shaft, a driving chain sprocket is disposed at one end of a driven sheave shaft, and the driving sheave shaft is disposed at such a location corresponding to the crank shaft of a conventional bicycle.

4. A stepless transmission according to claim 1, wherein the transmission mechanism is enclosed by a case which constitutes a part of the frame of the bicycle, said case being provided with a removable side cover and a bottom cover.

5. A stepless transmission according to claim 1, wherein the remote control shift means has a pair of discs encasing a coil spring, a fan shaped operation base plate provided with said shifting lever and a pair of wedge members, and a short conical retainer with a shaft, the ends of said pair of cables being connected respectively to the sides of said disc pair and disposed around grooves on the circumference of the discs, whereby when the lever is shifted, said base plate rotates to force one of the discs to rotate, the wedge members automatically anchoring the disc at any desired position as soon as an operator's hand leaves the shifting lever to enable the stepless speed transmission.

6. A V type sheave transmission for a bicycle comprising a spring control mechanism having a spring adapted to be wound up in either of two directions through a pair of cables connected to a pair of shifting discs and operated by a shifting lever, said spring being capable of storing mechanical energy and releasing it to move a movable sheave member of a V type sheave, thereby changing the relative groove depth of the sheave pair to enable automatic speed change after the shifting lever is set.

7. A V type sheave transmission according to claim 6 wherein a device used to shift the movable sheave member axially against the fixed sheave member to change the depth of the sheave groove is comprised of the spring biased control mechanism and a cam means.

* * * * *